UNITED STATES PATENT OFFICE.

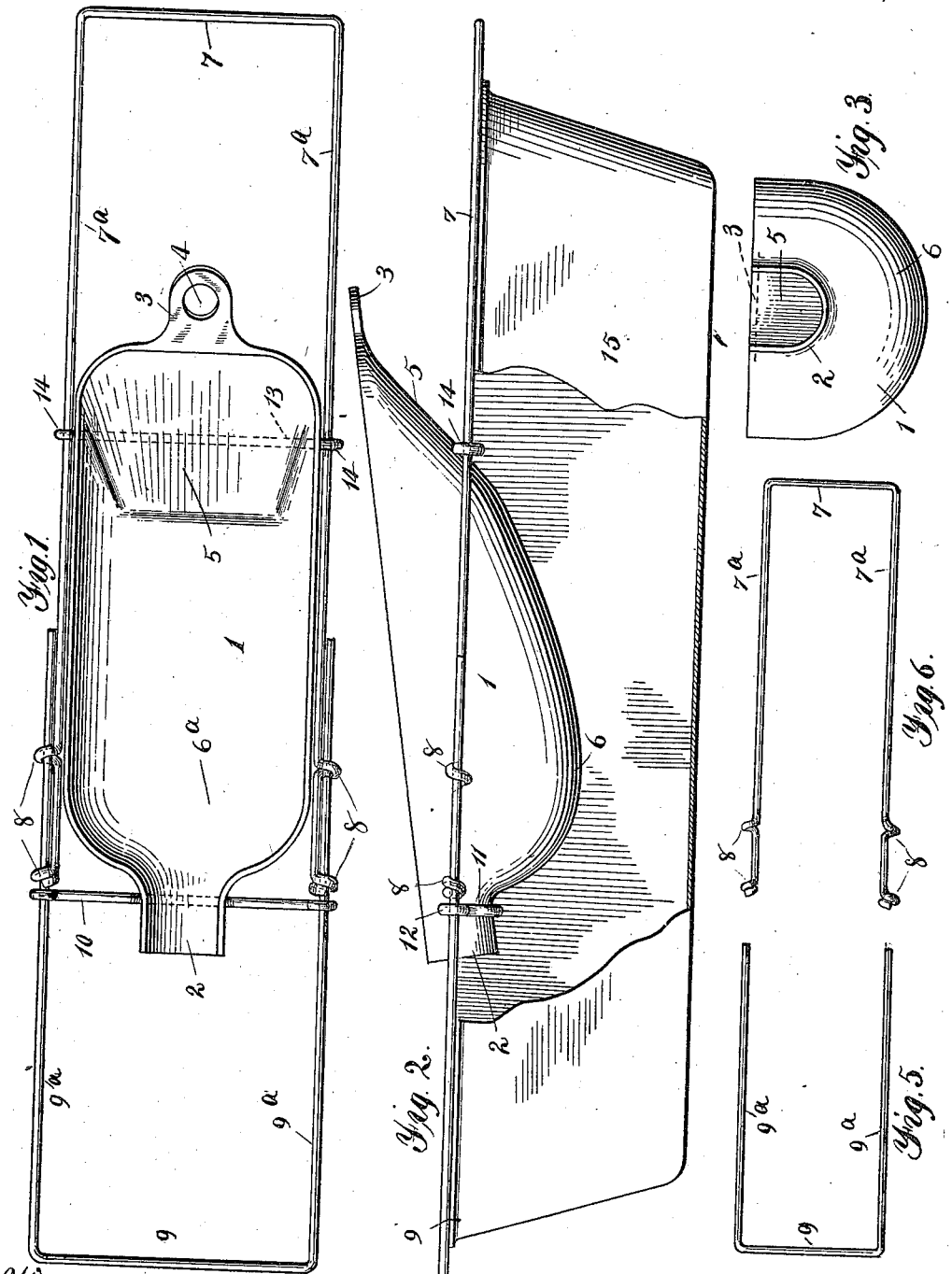

OTTO H. WILLARD, OF CHICAGO, ILLINOIS.

EGG-SEPARATOR.

1,029,902.  Specification of Letters Patent.  Patented June 18, 1912.

Application filed October 19, 1910. Serial No. 587,827.

*To all whom it may concern:*

Be it known that I, OTTO H. WILLARD, citizen of the United States, residing at Chicago, in the county of Cook and State of Illinois, have invented certain new and useful Improvements in Egg-Separators, of which the following is a specification.

My invention relates to egg separators, and the chief objects of the improvements which constitute the subject matter of this application for patent are:—to provide a simple and effective device adapted to facilitate the separation of the whites of eggs from the yolks; to furnish an egg separator having a receptacle that can be easily kept clean, and to arrange a support for the said receptacle that can be readily taken apart and packed in a small compass for convenience in storing or transporting.

I accomplish the desired results by means of the apparatus illustrated in the accompanying drawing, which forms a part of this application, the details of construction and manner of using being shown in the following views:—

Figure 1 is a top plan view of my improved egg separator; Fig. 2 is a side elevation of the device arranged in operative position upon a support; Fig. 3 is an end elevation of the receptacle removed from the frame; Fig. 4 is a detail showing one of the transverse supports, and— Figs. 5 and 6 are the frame members, detached.

Referring to the details of the drawings, the numeral 1 indicates a receiving tank or receptacle into which the eggs are to be broken. This tank or receptacle may be made of any suitable material, such as glass or china, but I prefer to use sheet metal formed into shape by the stamping process. The front end of the receptacle is furnished with an outlet in the form of a spout 2, which serves as an outlet through which the whites are caused to escape into a proper dish or bowl placed below. The rear end of the receptacle is furnished with a marginal lip or flange 3 which serves as a handle, and this flange has a hole 4 for convenience in suspending the receptacle upon a nail or peg, so that it will be out of the way when not in use. The bottom of the receptacle slopes up at an angle forming a flattened incline 5, while toward the front end the bottom is decidedly curved as indicated at 6, forming a concave pocket 6ª into which the yolk will settle and be retained while the white escapes from the said outlet 2.

In order to furnish a suitable support for the separating cup or receptacle, I supply a wire frame formed of two parts which are adapted to be connected or disconnected as desired. The rear section of the frame is formed of a single piece of suitable wire 7 bent in the form of an elongated bail having its side members 7ª parallel. Each of said members 7 is provided near the end with two eyes 8, formed by twisting or coiling the wire, and separated a short distance. The coöperating frame section is formed of a similar wire 9 bent in the same manner as the wire 7 to form a bail the side members 9ª of which are adapted to engage the eyes 8, in the manner shown, and when so assembled the sections form a rigid frame. Extending transversely between the side members of the section 9 is a cross wire 10, having its ends bent to form eyes 12, through which the wires 9ª are threaded, and the middle portion of the cross wire is bent down as shown at 11 to form a saddle in which the spout 2 of the receptacle rests when the parts are assembled as shown in the drawing. The rear end of the receptacle is supported by a similar cross wire 13, having eyes 14 which slidably engage the wires 7ª. This cross wire is placed so that the sloping portion 5 of the receptacle will rest thereon, and the inclination of the receptacle relative to the frame may be readily varied by sliding the said wire 13 forward and back, as will be readily understood by reference to Fig. 2. In this figure the frame containing the receptacle in operative position is shown supported upon the brim of a bowl or pan 15, the ends of the frame resting upon the margins of the pan so that the receptacle is conveniently arranged above the cavity of the pan which is intended to receive the whites of the broken eggs after being separated from the yolks.

The manner of using my improved egg separator will be readily understood from the foregoing description when compared with the drawing. The frame having been assembled and placed in position upon a pan or bowl and the receptacle arranged thereon and adjusted at a desirable angle by sliding the wire 13 upon the sides 7ª, the eggs are broken upon the incline and the entire contents of the shell is allowed to run down the incline into the depression 6. The yolk will settle to the bottom while the white will float above. The operator then increases the inclination of the receptacle by taking hold of the handle and raising the rear end, which will cause the white to run off through the spout 2 into the pan beneath. When the white has thus escaped the receptacle is lifted and the yolk poured into another pan or bowl (not shown) placed conveniently at hand.

Having thus described my invention, what I claim as new, is:—

1. An egg separator comprising a separable frame, a receptacle adapted to be supported on said frame in an inclined position, said receptacle having a bottom concave at one end and inclined upward at the other, a spout for the receptacle, and means for varying the inclination of the receptacle.

2. An egg separator comprising an oblong receptacle having a bottom provided with a concavity at one end and inclined upward at the other, a spout for the receptacle, a handle, a frame adapted to support the receptacle in an inclined position, said frame consisting of sections separably connected, and cross members supporting said receptacle.

3. An egg separator comprising an oblong receptacle having a concavity at one end and an inclined flat surface at the other, a spout forming an outlet adjacent the said concavity, a handle, a frame adapted to support the receptacle said frame composed of wire bent to form rectangular sections, eyes on one of said sections adapted to be removably engaged by the other section, a cross-bar fixed on one section, and a movable cross bar on the other section.

4. A device of the character described comprising an oblong receptacle open throughout its entire area and having a handle at one end and a spout at the opposite end, and having its bottom gradually inclined downwardly from the handle end to a point near the spout, and with its wall from the deepest point to the spout at an abrupt angle with the bottom of said spout.

In testimony whereof I affix my signature in the presence of two witnesses.

OTTO H. WILLARD.

Witnesses:
H. De Los Higman,
C. F. Bassett.

Copies of this patent may be obtained for five cents each, by addressing the "Commissioner of Patents. Washington, D. C."